US006905233B1

(12) United States Patent  
Blumenfeld-Kesler (10) Patent No.: US 6,905,233 B1  
(45) Date of Patent: Jun. 14, 2005

(54) LIGHT GUARD

(76) Inventor: William P Blumenfeld-Kesler, 6700 Mt. Vernon Rd., Auburn, CA (US) 95605

( * ) Notice: Subject to any disclaimer, the term of this patent is extended or adjusted under 35 U.S.C. 154(b) by 0 days.

(21) Appl. No.: 10/613,085

(22) Filed: Jul. 2, 2003

(51) Int. Cl.$^7$ .............................................. F21V 21/00
(52) U.S. Cl. ...................... 362/376; 362/377; 362/368
(58) Field of Search ........................ 362/362, 367–368, 362/373–378

(56) References Cited

U.S. PATENT DOCUMENTS

| | | | |
|---|---|---|---|
| 1,205,011 A | | 1/1916 | Phillips et al. |
| 1,369,008 A | * | 2/1921 | Christen ...................... 403/14 |
| 1,610,609 A | * | 12/1926 | Johnston ..................... 362/376 |
| 1,890,130 A | | 12/1932 | Scardina |
| 1,923,970 A | | 8/1933 | Dowling |
| 2,469,412 A | * | 5/1949 | Roebken ...................... 607/90 |
| 2,822,462 A | * | 2/1958 | Price ........................... 362/444 |
| 3,033,982 A | | 5/1962 | Burns |
| 3,300,637 A | | 1/1967 | Martland |
| 3,461,283 A | | 8/1969 | Hahn |
| 3,731,657 A | * | 5/1973 | Alessio ....................... 119/479 |
| 4,396,221 A | * | 8/1983 | Morgan et al. .......... 296/96.11 |
| 4,445,165 A | | 4/1984 | Sherwood et al. |
| 4,516,196 A | * | 5/1985 | Blake ......................... 362/311 |
| 4,621,310 A | | 11/1986 | Keating |
| 4,654,768 A | * | 3/1987 | Dryman et al. ............. 362/374 |
| 4,840,278 A | * | 6/1989 | Gelinas ........................ 211/18 |
| 4,959,762 A | * | 9/1990 | Soileau ....................... 362/376 |
| 5,660,464 A | | 8/1997 | Lin |
| 5,725,303 A | | 3/1998 | Lin |
| 5,997,160 A | | 12/1999 | Swanson |
| 6,116,759 A | | 9/2000 | Smith |

* cited by examiner

Primary Examiner—John Anthony Ward  
Assistant Examiner—Jason Han  
(74) Attorney, Agent, or Firm—Michael I. Kroll (57) ABSTRACT

The present invention 10 discloses a protective screen safety guard 12 that attaches to lamps, heat lamps, or the like 18 which provides means for both light and heat for living creatures 20 contained in an aquarium and/or terrarium habitat 22. The present invention is a protective screen guard having a screen element 12 with spaced apart flanged fasteners 14 for engaging the lip 16 of a lamp, heat lamp, or the like 18. There are three flange members 14 provided, two of which are permanently affixed to the screen guard 12 and the third, a removable flange 26 having a captive (pem-type) fastener 28 for the securing and removal of the screen guard 12 from the lip 16 of a heat lamp 18. In a preferred additional embodiment, an opaque deflector plate 36 is secured between the light bulb 30 and the screen 12. The opaque deflector plate 36 redirects heat produced by the light bulb 30 providing improved means to protect an animal. The deflector plate 36 is secured by means of a screw 38 that is inserted through an aperture 42 in the screen 12 and anchored with a threaded insert 44 that is affixed to the deflector plate 36.

1 Claim, 9 Drawing Sheets

LIGHT GUARD

BACKGROUND OF THE INVENTION

1. Field of the Invention

The present invention relates generally to lamp covers, more specifically, to a protective safety guard that attaches to lamps, heat lamps, or the like.

Lamps are commonly used to provide means for both light and heat for living creatures contained in an aquarium and/or terrarium habitat. The health of the living creatures depends on the availability of such energy sources. Depending on the type of living creature, (reptile, bird, rodent, fish) the light source needs to be positioned in or around the habitat to provide adequate lighting or heat. Such positioning can often be dangerous to the animal, as the direct contact to the light would cause burns or even death.

The present invention provides means to protect against such direct contact while maintaining both adequate lighting and means to change the light bulb. The present invention is a protective screen guard having a screen element with spaced apart flanged fasteners for engaging the lip of a lamp, heat lamp, or the like. There are three flange members provided, two of which are permanently affixed to the screen guard and the third, a removable flange having a captive (pem-type) fastener for the securing and removal of the screen guard from the lip of a heat lamp.

In addition to the screen guard of the present invention preventing captive reptiles from becoming burned by the light bulb when maneuvering about the lamp, it also prevents the human handler of the reptile from becoming burned by the lamp bulb when interacting and maneuvering items within the cage.

The screen guard also provides improved means to protect the light bulb from breaking if mishandled and drop. The screen guard creates a barrier that encloses the light bulb within the lamp housing.

A preferred additional element of the present invention is optionally utilized to further protect the captive animal against exposure to the light and heat. In this preferred additional element, an opaque deflector plate is secured between the light bulb and the screen. The opaque deflector plate redirects heat produced by the light providing improved means to protect an animal.

The opaque deflector plate creates a barrier between the light and the animal providing means to redirect the heat and protect the animal. The deflector plate is secured by means of a screw that is inserted through an aperture in the screen and anchored with a threaded insert that is affixed to the deflector plate.

2. Description of the Prior Art

There are other guards and protective devices for lamp safety. Typical of these is U.S. Pat. No. 1,205,011 issued to Paul D. Phillips on Nov. 14, 1916.

A patent was issued on Dec. 14, 1926 as U.S. Pat. No. 1,610,609 to Howard L. Johnston. Another patent was issued to Jack Anthony Scardina on Dec. 6, 1932 as U.S. Pat. No. 1,890,130. Yet another U.S. Pat. No. 1,923,970 was issued to Frank Dewey Dowling on Aug. 22, 1933 and still yet another was issued on May 10, 1949 to Carl R. Roebken as U.S. Pat. No. 2,469,412.

U.S. Pat. No. 2,822,462 was issued to Edison A. Price on Feb. 4, 1958. Another patent was issued to Robert T. Burns on May 8, 1962 as U.S. Pat. No. 3,033,982. Yet another U.S. Pat. No. 3,300,637 was issued to Theodore H. Martland on Jan. 24, 1967 and still yet another was issued to Richard Hahn on Aug. 12, 1969 as U.S. Pat. No. 3,461,283.

Another patent was issued to Bert J. Sherwood on Apr. 24, 1984 as U.S. Pat. No. 4,445,165. U.S. Pat. No. 4,621,310 was issued on Nov. 4, 1986 to Richard Keating and on Sep. 25, 1990 Trasimond A. Soileau was issued U.S. Pat. No. 4,959,762.

Still another patent was issued to Shih-Ming Lin on Aug. 26, 1997 as U.S. Pat. No. 5,660,464. U.S. Pat. No. 5,725,303 was issued on Mar. 10, 1998 to Shih-Ming Lin and on Dec. 7, 1999 Dennis K. Swanson was issued U.S. Pat. No. 5,997,160. On Sep. 12, 2000, U.S. Pat. No. 6,116,759 was issued to Charles C. Smith.

U.S. Pat. No. 1,205,011

Inventor: Paul D. Phillips

Issued: Nov. 14, 1916

This invention relates to lamp guards, and particularly to lamp guards for use in connection with reflector shades. It is an object of this invention to produce a lamp guard which may be moved into and out of operative position with ease and speed. It is another object of this invention to provide a simple and economical construction of lamp guard which may-be locked in a position in which it will prevent unauthorized removal of the lamp from its support.

U.S. Pat. No. 1,610,609

Inventor: Howard L. Johnston

Issued: Dec. 14, 1926

My invention relates to lighting fixtures and particularly to a screen device for light projecting apparatus. It is among the objects of filly invention to provide a device for retaining a light modifying screen or lens-like partition in front of the aperture of the lamp casing.

U.S. Pat. No. 1,890,130

Inventor: Jack Anthony Scardina

Issued: Dec. 6, 1932

This invention relates broadly to headlights for automobiles, and in accordance with the present invention the headlight is provided with means for protecting; the lens against damage, and especially against being damaged by gravel and the like which is thrown into the air by an approaching automobile or other vehicles. In accordance with the invention, the protector for the lens may be easily and quickly positioned on the headlight and will in no wise interfere with the effectiveness of the headlight.

U.S. Pat. No. 1,923,970

Inventor: Frank Dewey Dowling

Issued: Aug. 22, 1933

This invention relates to protecting and ornamental screens for automobile headlamps and like, and has for its object the production of a simple and efficient protecting means for the lens of an automobile lamp which will not only protect the lamp but will also beautify the headlamp. One of the principal objects of this invention is the production of a simple and efficient means for supporting an ornamental screen in spaced relation with respect to the lens of an automobile lamp, so as to protect the lamp, bulb and reflector from damage caused by flying gravel set motion by passing automobiles, fowl, sticks, birds, and other objects which would be likely to disfigure or break the lens of the automobile lamp.

U.S. Pat. No. 2,469,412

Inventor: Carl R. Roebken

Issued: May 10, 1949

This invention relates to therapeutic lamps. Therapeutic lamps or so-called "sun lamps" which deliver most of their ultra-violet, radiation within the erythemal range, 3350 to 2800 Angstrom units now on the market merely produce sunburn and tan and develop vitamin D. These lamps are of varied types and designs but all produce the aforesaid results. This invention is broadly directed to a therapeutic lamp which produces combined penetrating light and heat waves or rays, which are comparable to infra-red rays, and utilizing such combined rays for therapeutic purposes, or for any other desirable use.

U.S. Pat. No. 2,822,462

Inventor: Edison A. Price

Issued: Feb. 4, 1958

The present invention relates to an improved lighting device and it relates more particularly to an improved device of the spotlight type for use in connection with the lighting of window displays, display counters, stage presentations, and in many other similar applications. The principal object of this invention is to provide an improved lighting device. A further object of the present invention is to provide an improved mount for the conventional spotlight type that is provided with means for irremovably holding one or more lenses, filters or similar optical elements confronting the face of the bulb.

U.S. Pat. No. 3,033,982

Inventor: Robert T. Burns,

Issued: May 8, 1962

This invention relates, generally, to protective equipment for lighting fixtures, and more particularly to a wire protective device for a lighting fixture placed in an inaccessible area such as a high bay ceiling of a manufacturing plant to protect the lamp within the fixture from damage by missiles. The primary object of this invention is to provide a novel protective device including a wire guard affording maximum protection to a lamp within a lighting fixture, combined with maximum ease of lamp replacement.

U.S. Pat. No. 3,300,637

Inventor: Theodore H. Martland

Issued: Jan. 24, 1967

The present invention relates to new and useful improvements in guards or protectors for certain types of electric light bulbs, namely, light bulbs which are known to the public as flood lights and spot lights. The main object of the present invention to provide for means of safeguarding the life of flood lights and spot lights against damages caused not only intentionally but also accidentally through the impact of foreign objects propelled by high speed rotating machines, such as, for example, lawn mowers, edge trimmers, and the like. A further object of this invention is to provide an economical means of simple yet very practical construction, of neat and attractive appearance, inexpensively manufacturable, capable of transducing substantially all of the absorbed shocks not to the light bulb proper, but to the metallic fixture to which the bulb is connected, the bulb remaining, therefore, free from shocks.

U.S. Pat. No. 3,461,283

Inventor: Richard Hahn

Issued: Aug. 12, 1969

A vandal-proof luminary includes a housing having an inwardly facing rim defining the margin of an illumination aperture. A grid, having a dome-shaped configuration with an outwardly projecting skirt portion embedded in the margin of the aperture, projects inwardly of the housing. The grid is structurally integral with the housing to provide a protective guard for the light source. A luminary screen is disposed in the housing between the grid and the light source. The screen is spaced laterally to provide a substantially peripheral vent for the passage of air, but has a greater diameter than the aperture.

U.S. Pat. No. 4,445,165

Inventor: Bert J. Sherwood

Issued: Apr. 24, 1984

A unitary grommet, adapted to securely mount therein a headlight-protecting screens and further adapted to enable secure mounting thereof in a headlight-opening-defining portion of a vehicle bumper or the like, for protecting the vehicle headlight, is described. The unitary grommet is comprised of flexibly-resilient material, and includes a common wall, separating a peripheral screen-mounting section. The screen-mounting section extends behind the vehicle bumper headlight-opening, for preventing access thereto, and to enable secure and efficient mounting of the screen in the grommet. The bumper-mounting section is adapted to extend peripherally about the bumper headlight opening, when the grommet is properly mounted, and provides a molded channel for securely mounting the grommet in the vehicle bumper headlight opening.

U.S. Pat. No. 4,621,310

Inventor Richard Keating

Issued: Nov. 4, 1986

A heating luminaire has a slightly resilient spun metal housing with a rolled bead of larger diameter formed near the circular opening thereof. A wire guard having four extensions arranged to seat within the bead is inserted through the circular opening, which is of smaller diameter than the bead, by bending one of the extensions and distorting the resilient housing. The guard is locked in place by bending the extension back toward its original position.

U.S. Pat. No. 4,959,762

Inventor: Trasimond A. Soileau

Issued: Sep. 25, 1990

Containment means for a luminaire that captures hot particles created by the unlikely event of a pressurized lamp rupture is disclosed. In one embodiment, the containment means comprises a mesh interposed between the lamp and a refractor of the luminaire typically formed of an acrylic material. The mesh captures hot particles having a sufficient heat capacity and temperature to create excess heat damage to the refractor.

U.S. Pat. No. 5,660,464

Inventor: Shih-Ming Lin

Issued: Aug. 26, 1997

A halogen lamp comprises a lamp casing, a lamp disposed in the lamp casing, a halogen tube disposed in the lamp, and a halogen lamp protection net covering the lamp. A protection plate covers the halogen tube. A first press plate has a first proximal end and a first distal end. A first through hole is formed on a middle portion of the first press plate. A first threaded hole is formed on the first distal end. A second press plate has a second proximal end and a second distal end. A second through hole is formed on a middle portion of the second press plate. A second threaded hole is formed on the second distal end. The first distal end is inserted in the lamp. The first proximal end presses a first end of the protection plate. The lamp and the first end of the protection plate are fastened together. The second distal end is inserted in the lamp. The second proximal end presses a second end of the protection plate. The lamp and the second end of the protection plate are fastened together. The halogen lamp protection net has a brim and a plurality of meshes. The halogen lamp protection net and the lamp are fastened together.

U.S. Pat. No. 5,725,303

Inventor: Shih-Ming Lin

Issued: Mar. 10, 1998

A guard netting for protecting the top opening of a lampshade that directs light upwards to prevent objects falling against the light bulb within the lampshade. The guard netting is designed to be inserted into different sized lampshades. The guard netting has multiple mounting holes for the attachment of locating plates with a screw and nut. Each locating plate will extend beyond the edge of the guard netting to hold the guard netting in place within a lampshade at a position below the flange at the top of the lampshade.

U.S. Pat. No. 5,997,160

Inventor: Dennis K. Swanson

Issued: Dec. 7, 1999

A stand alone electric lamp for illumination which includes a tungsten-halogen bulb as the illuminating member. The lamp includes a support member, an upwardly directed open pan affixed to the support member in which the tungsten-halogen light bulb is disposed, a protector member disposed over the open pan to prevent foreign objects from coming into contact with the tungsten-halogen light bulb and a thermally activated switch. The protector member is substantially transparent to light from the tungsten-halogen bulb to allow light therefrom to pass through the protector member in a substantially unobstructed fashion. The thermally activated switch is disposed within the open pan for interruption of the application of electrical energy to the tungsten-halogen light bulb when temperatures at the protector member reaches a predetermined level. The thermally activated switch may be a one time operational device which functions in the manner of a fuse, a manually resettable switch, or a switch which pivots from off to on as the temperature drops from the predetermined level at which it becomes open to a lesser level. The switch preferably incorporates a thermal sensor such as a thermistor or alternatively may be a bimetal disc or a linear bimetal unit depending upon the particular application desired.

U.S. Pat. No. 6,116,759

Inventor: Charles C. Smith

Issued: Sep. 12, 2000

An armored light fixture which comprises an armored housing which defines an upper passageway through which light may pass, at least one lamp disposed within the armored housing, at least one reflector structure which is adjustable in position and which is disposed above the armored housing to enable the adjustable reflection of light which passes through the upper passageway of the armored housing.

While these safety lights and protective guards may be suitable for the purposes for which they were designed, they would not be as suitable for the purposes of the present invention, as hereinafter described.

SUMMARY OF THE PRESENT INVENTION

The present invention discloses a protective screen safety guard that attaches to lamps, heat lamps, or the like which provides means for both light and heat for living creatures contained in an aquarium and/or terrarium habitat. The present invention is a protective screen guard having a screen element with spaced apart flanged fasteners for engaging the lip of a lamp, heat lamp, or the like. There are three flange members provided, two of which are permanently affixed to the screen guard and the third, a removable flange having a captive (pem-type) fastener for the securing and removal of the screen guard from the lip of a heat lamp. In a preferred additional embodiment, an opaque deflector plate is secured between the light bulb and the screen. The opaque deflector plate redirects heat produced by the light bulb providing improved means to protect an animal. The deflector plate is secured by means of a screw that is inserted through an aperture in the screen and anchored with a threaded insert that is affixed to the deflector plate.

A primary object of the present invention is to provide means to cover and protect a light bulb with a screen.

Another object of the present invention is to provide means to cover a light bulb with a screen for use with living creatures contained in an aquarium and/or terrarium habitat.

Still another object of the present invention is to provide means to cover a light bulb with a screen to prevent accidental contact between the living creature and the bulb.

Yet another object of the present invention is to provide a screen guard that is easily secured and/or removed from the lamp.

Still another object of the present invention is to provide means to cover a light bulb with a screen to prevent accidental contact between the user and the bulb.

Yet another object of the present invention is to provide a screen guard having a screen element with spaced apart flanged fasteners for engaging the lip of a lamp, heat lamp, or the like.

Another object of the present invention is to provide means to secure the screen to the lamp with three flanges. Whereas, two flanges are permanently affixed to the screen, and one flange having a captive (pem-type) fastener for the securing and removal of the screen guard from the lip of a heat lamp.

Still another object of the present invention is to provide means to secure an opaque deflector plate between the light bulb and the screen.

Additional objects of the present invention will appear as the description proceeds.

The present invention overcomes the shortcomings of the prior art by providing an improved means to protect the user and living creatures from accidental contact with a light bulb.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 screen element
14 fastener
16 lip
18 heat lamp
20 animal
22 cage
24 welded fastener
26 removable flange
28 pem fastener
30 bulb
32 washer
34 insert
36 deflector plate
38 screw
40 washer
42 aperture
44 insert

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
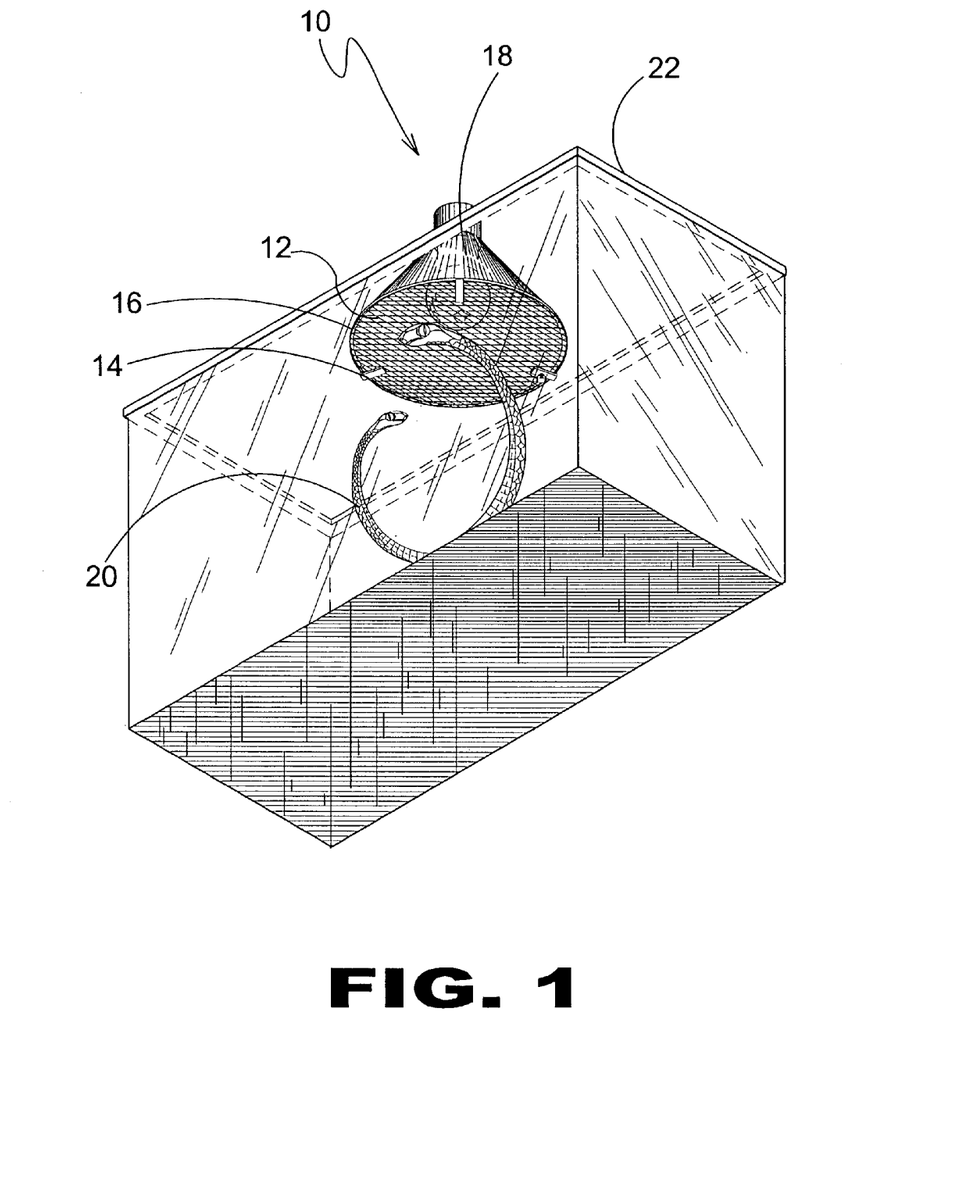
FIG. 1 is an illustrative view of the present invention in use (view looking up).

Turning to FIG. 1, shown therein is an illustrative view of the present invention 10 in use (view looking up). The present invention 10 which is a protective screen guard having a screen element 12 with spaced apart flanged fasteners 14 for engaging the lip 16 of a heat lamp 18. There are three flange members 14 provided, two of which are welded to the screen guard 12 and the third, a removable flange having a pem-type fastener for the securing and removal of the screen guard 12 from the lip 16 of a heat lamp 18. The screen guard 12 of the present invention prevents captive reptiles 20 from becoming burned by the heat lamp bulb when maneuvering about the lamp 18. It also prevents the human handler of the reptile 20 from becoming burned by the lamp bulb when interacting and maneuvering items within the cage 22.

Figure 2:
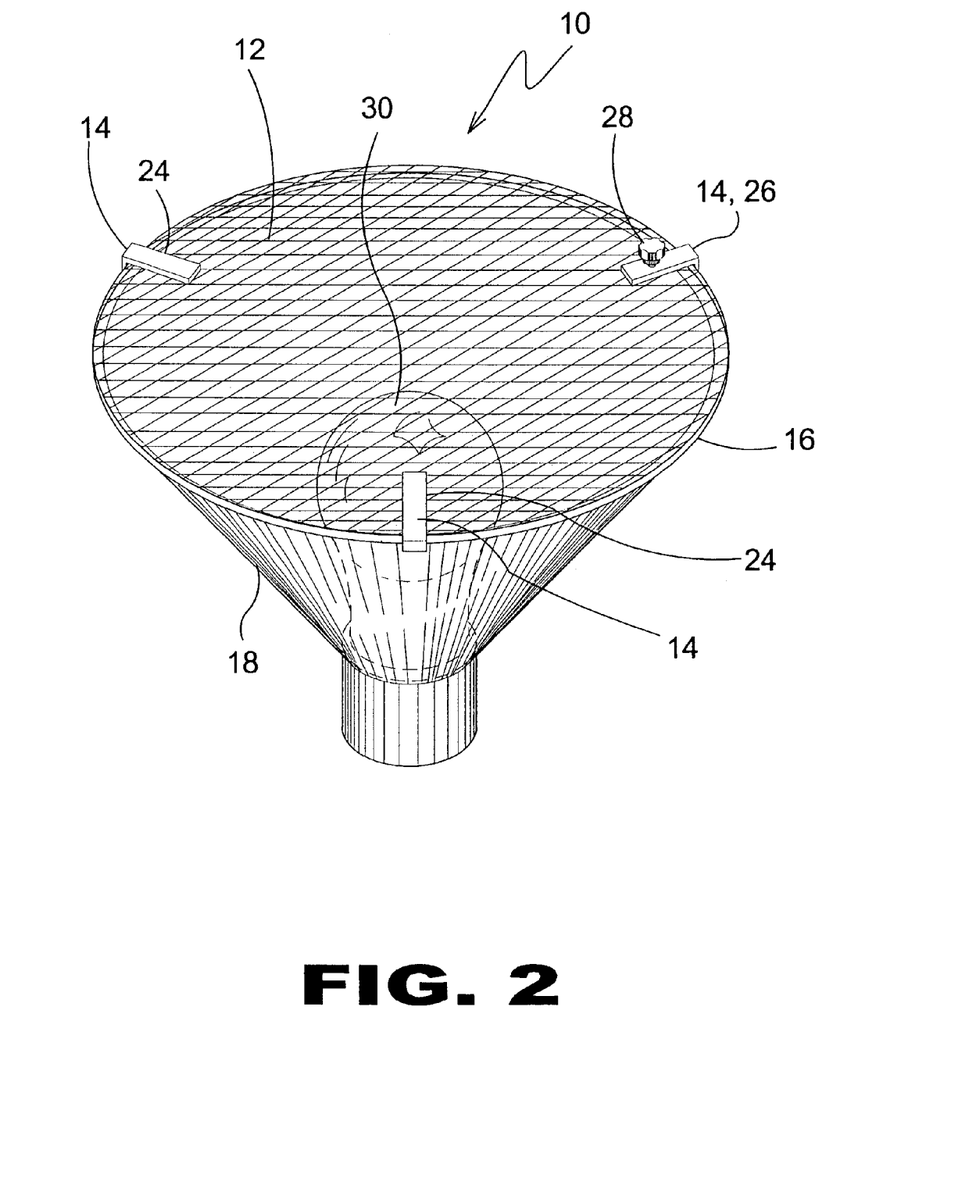
FIG. 2 is a perspective view of the present invention.

Turning to FIG. 2, shown therein is a perspective view of the present invention 10. Shown is the present invention 10 which is a protective screen guard having a screen element 12 with spaced apart flanged fasteners 14 for engaging the lip 16 of a heat lamp 18. There are three flange members 14 provided, two of which are welded 24 to the screen guard 12 and the third, a removable flange 26 having a pem-type fastener 28 for the securing and removal of the screen guard 12 from the lip 16 of a heat lamp 18. Also shown is the bulb 30 of the heat light 18.

Figure 3:
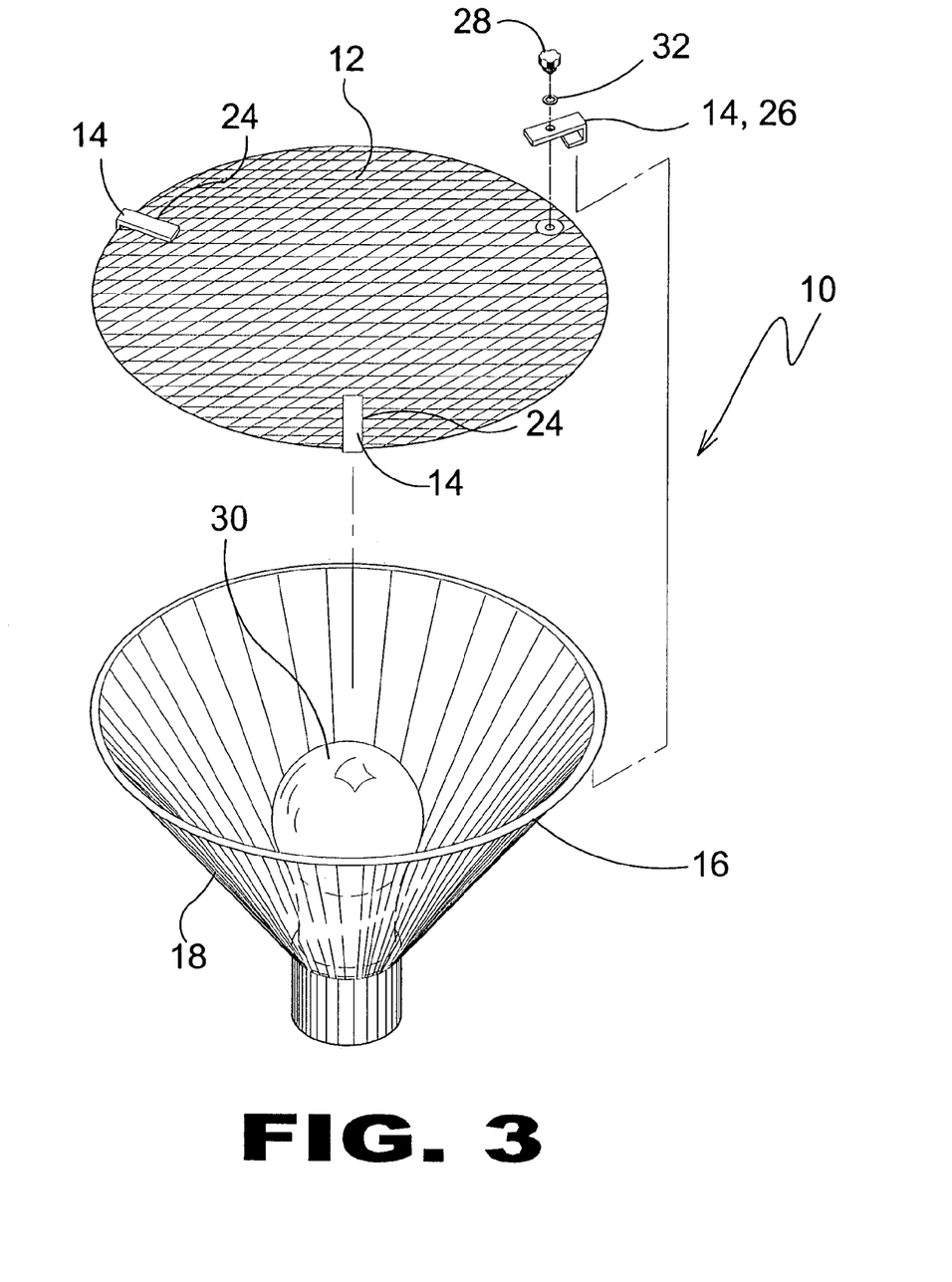
FIG. 3 is an exploded view of the present invention.

Turning to FIG. 3, shown therein is an exploded view of the present invention 10. The protective screen guard of the present invention 10 consists of a screen element 12 with spaced apart flanged fasteners 14 for engaging the lip 16 of a heat lamp 18. There are three flange members 14 provided, two of which are welded 24 to the screen guard 12 and the third, a removable flange 26 having a pem-type fastener 28 for the securing and removal of the screen guard 12 from the lip 16 of a heat lamp 18. Also shown is bulb 30 and pem washer 32.

Figure 4:
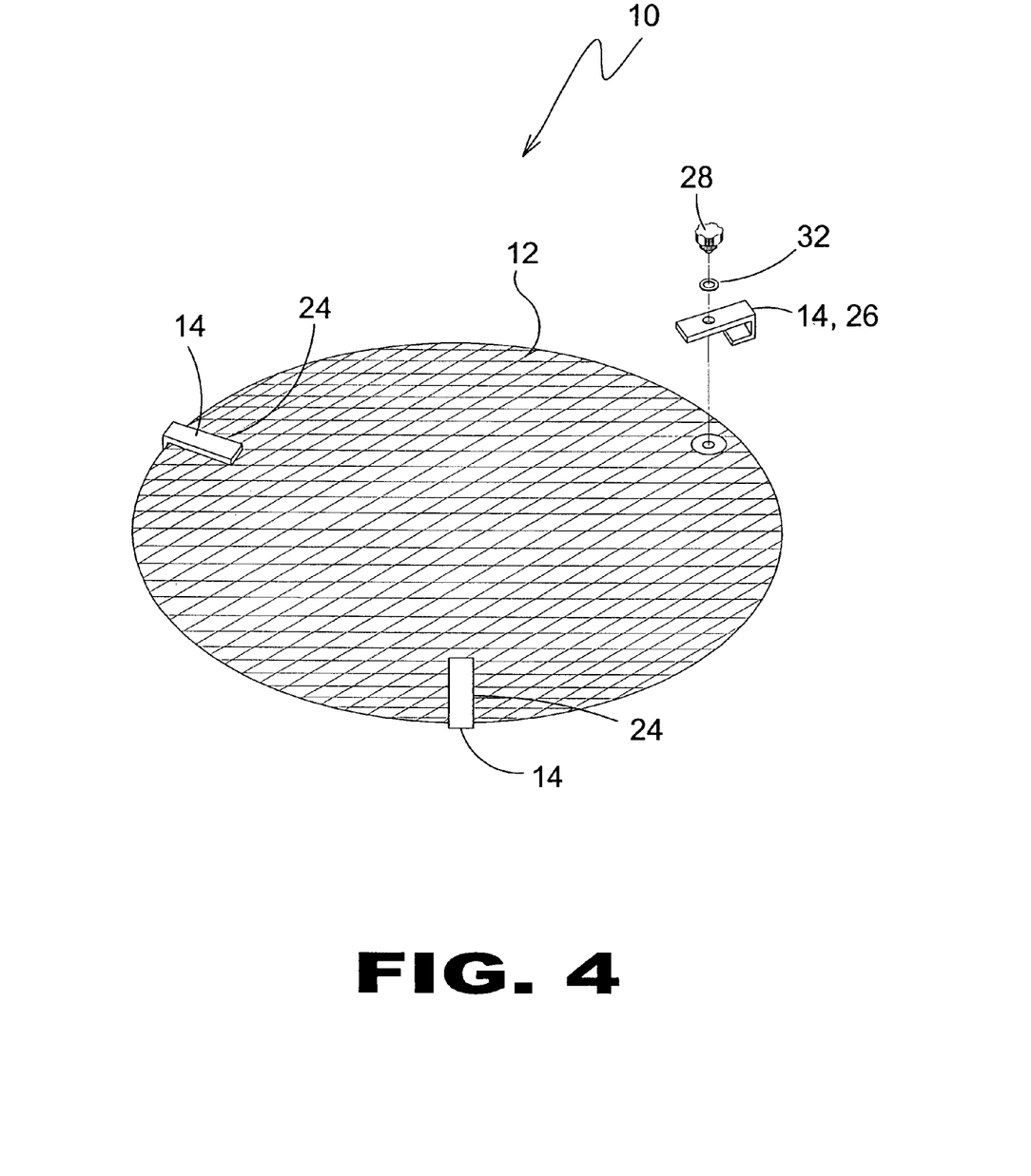
FIG. 4 a perspective view of the present invention.

Turning to FIG. 4, shown therein is a perspective view of the present invention 10. The protective screen guard of the present invention consists of a screen element 12 with spaced apart flanged fasteners 14 for engaging the lip of a heat lamp. There are three u-shaped flange members 14 provided each having a first and second side for receiving the screen guard 12 and lip thereinbetween, two of which are welded 24 to the screen guard 12 and the third, a removable flange 26 having a pem-type fastener 28 and associated washer 32 for the securing and removal of the screen guard 12 from the lip of a heat lamp. Pem fastener 28 has a nut end and a threaded end to mate with a threaded insert inside the screen guard 12.

Figure 5:
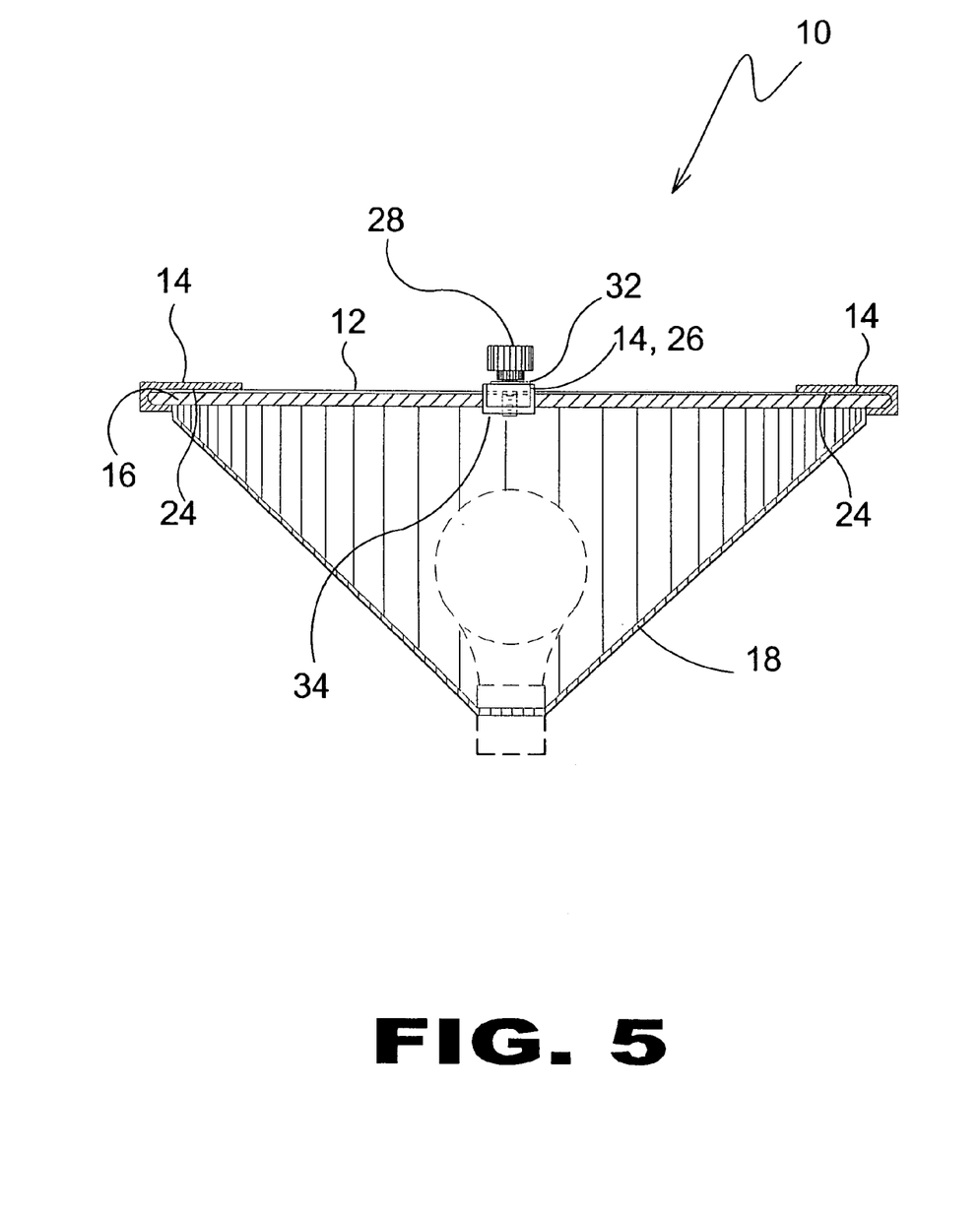
FIG. 5 is a sectional view of the present invention.

Turning to FIG. 5, shown therein is a sectional view of the present invention 10. The protective screen guard of the present invention 10 consists of a screen element 12 with spaced apart flanged fasteners 14 for engaging the lip 16 of a heat lamp 18. There are three flange members 14 provided, two of which are welded 24 to the screen guard 12 and the third, a removable flange 26 having a pem-type fastener 28 with associated washer 32 and threaded insert 34 for the securing and removal of the screen guard 12 from the lip 16 of a heat lamp 18.

Figure 6:
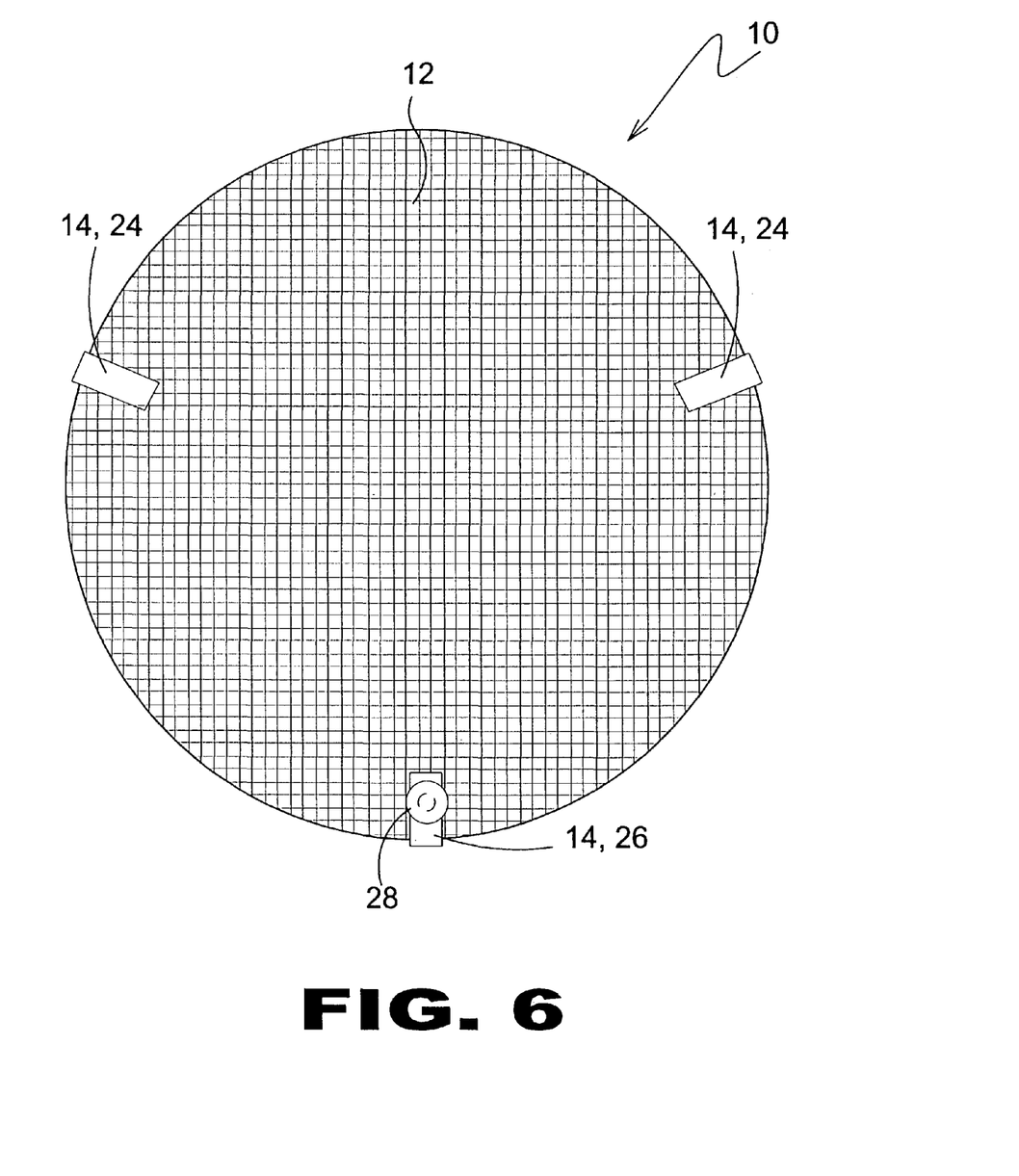
FIG. 6 is a top view of the present invention.

Turning to FIG. 6, shown therein is a top view of the present invention 10. The protective screen guard of the present invention 10 consists of a screen element 12 with spaced apart flanged fasteners 14 for engaging the lip of a heat lamp. There are three flange members 14 provided, two of which are welded 24 to the screen guard 12 and the third, a removable flange 26 having a pem-type fastener 28 for the securing and removal of the screen guard 12 from the lip of a heat lamp.

Figure 7:
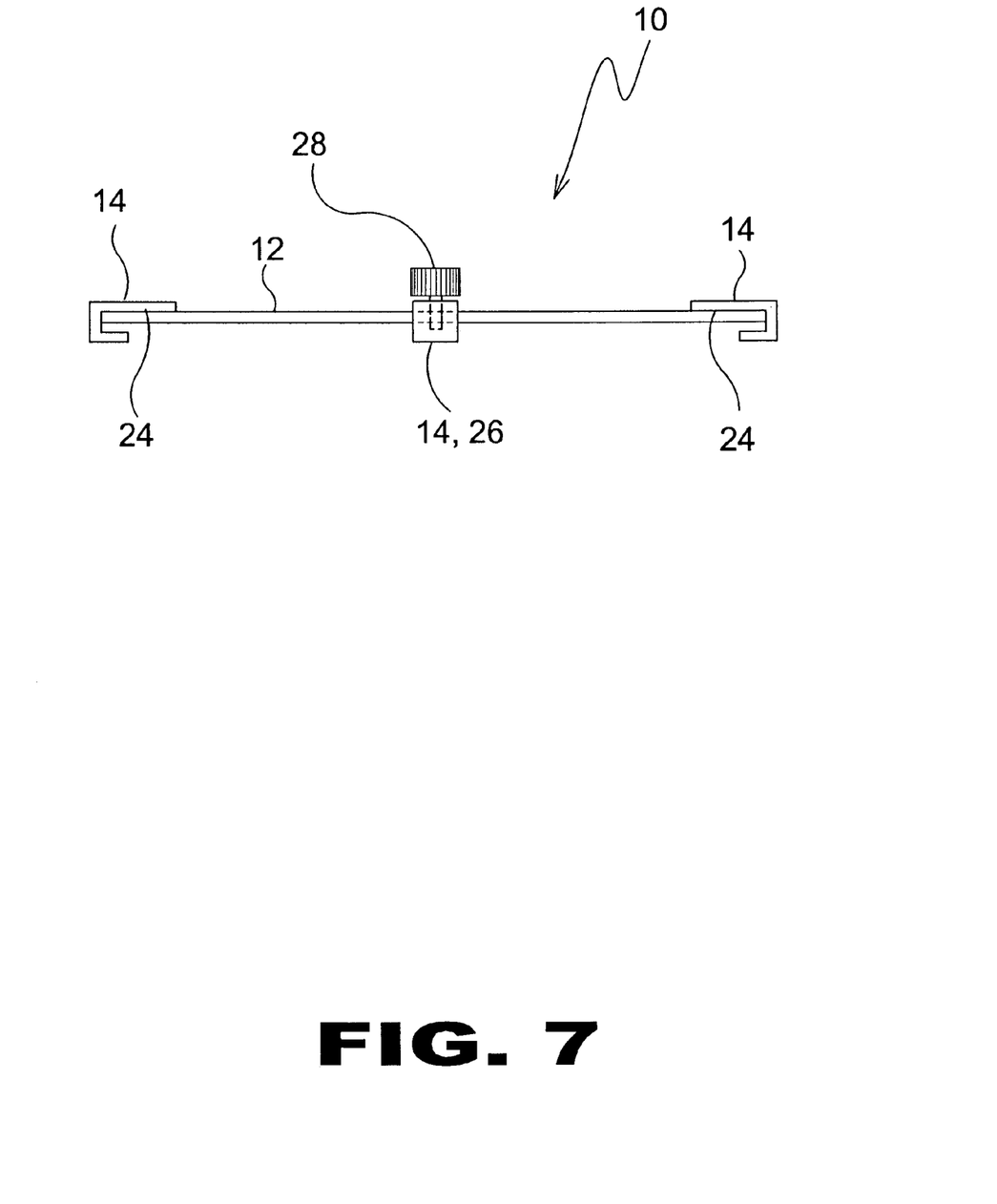
FIG. 7 is a side view of the present invention.

Turning to FIG. 7, shown therein is a side view of the present invention 10. The protective screen guard of the present invention 10 consists of a screen element 12 with spaced apart flanged fasteners 14 for engaging the lip of a heat lamp. There are three flange members 14 provided, two of which are welded 24 to the screen guard 12 and the third, a removable flange 26 having a pem-type fastener 28 for the securing and removal of the screen guard 12 from the lip of a heat lamp.

Figure 8:
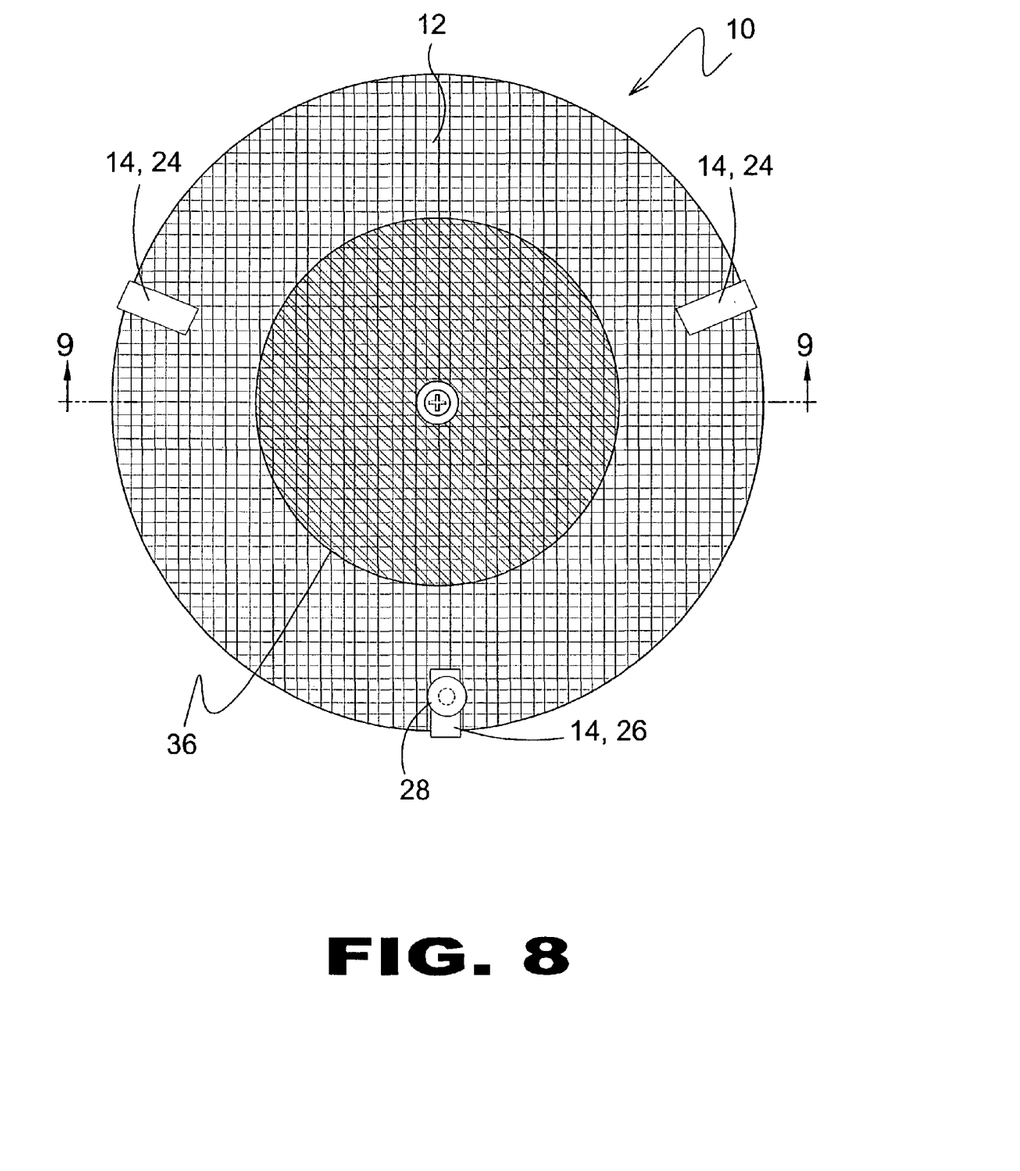
FIG. 8 is a top view of the present invention with preferred additional element.

Turning to FIG. 8, shown therein is a top view of the present invention 10 with preferred additional element. To further protect against exposure to the light heat a deflector plate 36 is secured between the light bulb and the screen 12. The deflector plate 36 redirects heat produced by the light bulb providing improved means to protect an animal. The fasteners 14, 24, 26 and 28 are also shown.

Figure 9:
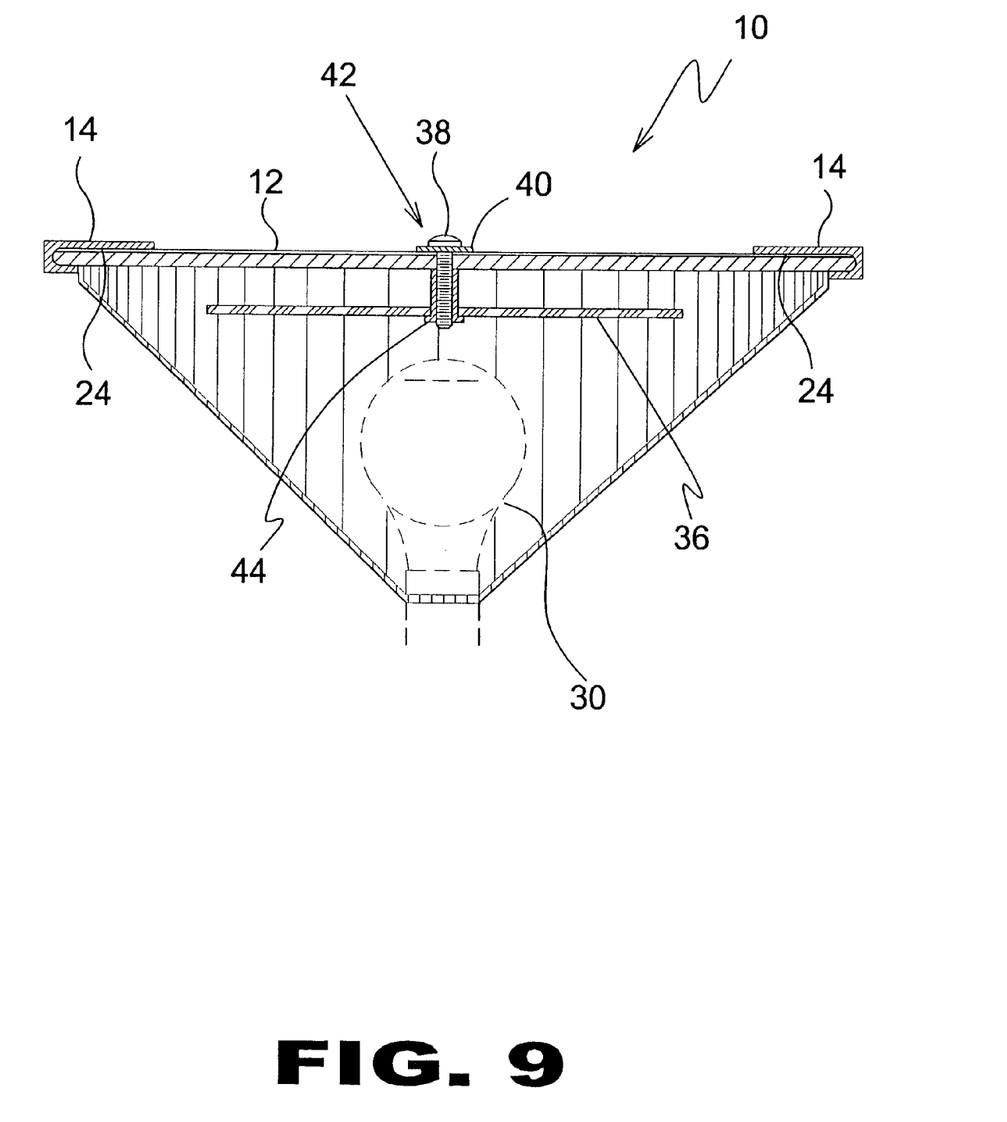
FIG. 9 is a sectional view of the present invention with preferred additional element.

Turning to FIG. 9, shown therein is a sectional view of the present invention 10 with preferred additional element. Depicted in FIG. 9 is a sectional view from FIG. 8. The deflector plate 36 creates a barrier between the light bulb 30 and the animal providing means to redirect the heat and protect the animal. The deflector plate 36 is secured by means of a centrally disposed fastener or screw 38 with washer 40 that is inserted through a centrally disposed aperture 42 in the screen 12 and anchored with a female threaded insert 44 that is affixed to the deflector plate 36. The welded flanged fasteners 14, 24 are also shown.

I claim:
1. A lamp assembly for use in heating a cage having an animal therein, comprising:
a) a lamp disposed in the cage for providing light and heat to the cage, said lamp having a base for mounting a bulb and a concave reflector extending outwardly in the form of a cone from said base, said concave reflector having an open end thereon, a lip being disposed on said open end of said reflector;
b) said bulb being a light source for providing light and heat to the cage;
c) a flat, circular screen guard disposed on said lip of said lamp to prevent the animal from contacting the light source;
d) a plurality of three fasteners disposed on said screen guard to permit the screen guard to be attached to the lip of the reflector, two of said fasteners being fixedly attached by welding to said screen guard, wherein at least one of said fasteners is removably attached to said screen guard, said removably attached fastener comprising a pem-type fastener to permit the screen guard to be removably attached to the lamp, all of said fasteners being U-shaped having a first and second sides wherein said sides form a pair of flanges, one side of said removably attached fastener having a threaded aperture therein for receiving a mating threaded nut, said threaded nut having a nut end and a threaded end, said threaded end of said threaded nut passing through said screen guard, said threaded end of said threaded nut mating with a threaded insert disposed inside said screen guard to permit said fastener to be removably attached to the lamp, wherein said flanges receive said screen guard and said lip between said sides thereof to permit the screen guard to be attached to the lamp; and
a flat, circular deflector plate disposed spaced from said screen guard and between said screen guard and said bulb to permit light to be deflected into said reflector to prevent the animal from being burned by the light source, said deflector plate being wider than said bulb, said deflector plate being spaced from and connected to said screen guard by a threaded fastener, said screen guard having an aperture therein, wherein said aperture is centrally located in said screen guard, said deflector plate having a female threaded insert centrally disposed therein, said threaded fastener having a screw head end and a threaded end, said threaded end passing through said aperture in said screen guard to mate with said female threaded insert centrally disposed in said deflector plate to permit the deflector plate to be connected to the screen guard.

* * * * *